UNITED STATES PATENT OFFICE.

ADOLF CHRISTIAN MAX RIECK, OF HAMBURG, GERMANY.

PROCESS OF EXTRACTING CACAO-BUTTER.

SPECIFICATION forming part of Letters Patent No. 636,849, dated November 14, 1899.

Application filed September 19, 1898. Serial No. 691,363. (No specimens.)

*To all whom it may concern:*

Be it known that I, ADOLF CHRISTIAN MAX RIECK, a subject of the German Emperor, and a resident of Hamburg, in the German Empire, have invented certain new and useful Improvements in and Relating to the Manufacture of Cacao-Butter, of which the following is a specification.

The present invention relates to improvements in the manufacture of cacao-butter; and the object of the said improvements is to produce a process by which in a rational manner a more pure cacao-butter, as well as a better unoiled cacao residue, are obtained.

In the process hitherto in use for obtaining cacao-butter the cacao-beans were roasted and hulled and then the nuts ground into a fine oily cacao-paste, a considerable heat (104° to 140° Fahrenheit) being applied during this grinding operation. The thus-obtained viscid cacao-paste was filled in slightly-heated filter-presses and the oil or fat expelled by pressing. From this process commonly in use results, however, only a small produce of cacao-butter, and besides this the said process is expensive and the handling of the oily paste rather loathsome. A further great inconvenience of this process consists in that by the pressing operation, especially when applying a higher pressure, a great number of brown cacao particles of the finely-powdered cacao-nuts are also expelled, which cacao particles intermingle with the cacao-oil or cacao-butter and soil thereby the latter. In order to remove the said brown cacao particles, the cacao-butter must therefore be filtered several times, if necessary.

The above-stated inconveniences are obviated by the new process forming the subject-matter of the present invention and which process permits so great a produce of cacao-butter that only about ten per cent. of the oil remains in the cacao residues, while when working according to the well-known method the remaining oil or butter amounts to thirty to thirty-five per cent.

The mode of practicing my invention is as follows: The cacao-beans are first roasted and hulled in the usual manner and then ground to form a coarse granular mass, the grains being preferably about the size of rice-grains, which may be effected in any suitable grinding-mill, after which the finer particles resulting from the operation of grinding are removed by screening, and the granular material so obtained is finally subjected to pressure in a filter-press, as usual. As there is no finely-reduced cacao-paste to be treated in the filter-presses, there is also no possibility that fine brown cacao particles may be expelled together with the cacao oil or butter even if a very high pressure is applied. In consequence of this fact higher pressure can be applied in the filter-presses, wherefrom results a greater output of cacao-butter, so that the cacao residues contain only eight to fifteen per cent. of oil. The cacao residues may be powdered and subjected to further treatment in well-known manner.

What I claim as my invention, and desire to secure by Letters Patent, is—

In the manufacture of cacao-butter, the improvement which consists in granulating the previously roasted and hulled cacao-beans, removing from the granulated material the finer particles, and then subjecting said material to pressure and filtration.

ADOLF CHRISTIAN MAX RIECK.

Witnesses:
FRANZ REINCKE,
MAX KAEMPFF.